(12) United States Patent
Byron et al.

(10) Patent No.: US 11,544,312 B2
(45) Date of Patent: Jan. 3, 2023

(54) DESCRIPTOR UNIQUENESS FOR ENTITY CLUSTERING

(71) Applicant: International Business Machines Corporation, Armonk, NY (US)

(72) Inventors: Donna K. Byron, Petersham, MA (US); Edward Graham Katz, Washington, DC (US); Christopher F. Ackermann, Fairfax, VA (US); Charles E. Beller, Baltimore, MD (US)

(73) Assignee: International Business Machines Corporation, Armonk, NY (US)

( * ) Notice: Subject to any disclaimer, the term of this patent is extended or adjusted under 35 U.S.C. 154(b) by 165 days.

(21) Appl. No.: 16/792,456

(22) Filed: Feb. 17, 2020

(65) Prior Publication Data

US 2021/0256049 A1    Aug. 19, 2021

(51) Int. Cl.
| | | |
|---|---|---|
| *G06F 16/35* | (2019.01) | |
| *G06F 16/33* | (2019.01) | |
| *G06F 16/332* | (2019.01) | |
| *G06K 9/62* | (2022.01) | |
| *G06F 40/169* | (2020.01) | |
| *G06N 7/00* | (2006.01) | |
| *G06F 40/295* | (2020.01) | |
| *G06F 40/216* | (2020.01) | |

(52) U.S. Cl.
CPC ........ *G06F 16/355* (2019.01); *G06F 16/3329* (2019.01); *G06F 16/3334* (2019.01); *G06F 40/169* (2020.01); *G06F 40/295* (2020.01); *G06K 9/6221* (2013.01); *G06N 7/005* (2013.01); *G06F 40/216* (2020.01)

(58) Field of Classification Search
CPC ............... G06F 16/355; G06F 16/3334; G06F 16/3329; G06F 40/169; G06F 40/295; G06K 9/6221; G06N 7/055
See application file for complete search history.

(56) References Cited

U.S. PATENT DOCUMENTS

| | | | |
|---|---|---|---|
| 5,715,468 A * | 2/1998 | Budzinski | ........... G06F 16/3334 707/E17.084 |
| 7,672,833 B2 | 2/2010 | Blume et al. | |
| 8,370,328 B2 | 2/2013 | Woytowitz et al. | |
| 9,116,982 B1 | 8/2015 | Stern et al. | |
| 10,176,165 B2 | 1/2019 | Cao et al. | |

(Continued)

OTHER PUBLICATIONS

Ackermann, Chris et al., "Descriptor Uniqueness for Entity Clustering", filed Aug. 7, 2019, U.S. Appl. No. 16/534,959.

(Continued)

*Primary Examiner* — Matthew J Ellis
(74) *Attorney, Agent, or Firm* — Stephen J. Walder, Jr.; Brian Welle (57) ABSTRACT

A mechanism is provided in a data processing system to implement a cognitive natural language processing (NLP) system with descriptor uniqueness identification to support named entity mention clustering. The mechanism annotates a set of documents from a corpus of documents for entity types and mentions, collects descriptor usages from all documents in the corpus of documents, analyzes the descriptor usages to classify the descriptors as base terms or modifier terms, generates compatibility scores for the descriptors, and performs entity merging of entity clusters based on the compatibility scores.

20 Claims, 4 Drawing Sheets

(56) References Cited

U.S. PATENT DOCUMENTS

| | | | | |
|---|---|---|---|---|
| 2002/0194230 | A1* | 12/2002 | Polanyi | G06F 40/30 |
| | | | | 704/9 |
| 2006/0047690 | A1* | 3/2006 | Humphreys | G06F 40/295 |
| 2007/0067285 | A1* | 3/2007 | Blume | G06Q 10/10 |
| 2014/0101542 | A1* | 4/2014 | Albrecht | G06F 16/335 |
| | | | | 715/256 |
| 2017/0255694 | A1* | 9/2017 | Byron | G06F 16/245 |
| 2017/0344625 | A1* | 11/2017 | Hosokawa | G06F 16/288 |
| 2017/0351816 | A1* | 12/2017 | Fink | G06F 40/295 |
| 2018/0005117 | A1* | 1/2018 | Allen | G06F 40/20 |
| 2018/0137190 | A1* | 5/2018 | Beller | G06F 7/08 |

OTHER PUBLICATIONS

Duan', Lian et al., "An Online Name Disambiguation Method Based on Entity and Property Co-occurrence", 2017 Second International Conference on Mechanical, Control and Computer Engineering (ICMCCE), Dec. 2017, 4 pages, IEEE.

Singh, Sameer, "Large-Scale Cross-Document Coreference Using Distributed Inference and Hierarchical Models", Proceedings of the 49th Annual Meeting of the Association for Computational Linguistics, Portland, Oregon, Jun. 19-24, 2011, 11 pages.

Yang, Xiaofeng et al., "An NP-Cluster Based Approach to Coreference Resolution", COLING 2004: Proceedings of the 20th International Conference on Computational Linguistics, Aug. 2004, 7 pages.

* cited by examiner

BASE: STAR  mod: Football<SPORTS>
BASE: CEO  mod:CompanyA<Company>  time: 2012
BASE: Executive  mod: Business  mod: American<NATIONALITY>
BASE: Chairwoman  mod: CompanyB<Company>
BASE: President  mod: CompanyB<Company>
BASE: CEO  mod: CompanyB<Company>
BASE: WOMAN  mod: first  mod: CompanyB<Company>
BASE: personality  mod: TV

FIG. 6

BASE: STAR  mod: Football<SPORTS>  SPEC: none
BASE: CEO  mod:CompanyA<Company>  time: 2012  SPEC: def
BASE: Executive  mod: Business  mod: American<NATIONALITY>  SPEC: indef
BASE: Chairwoman  mod: CompanyB<Company>  SPEC: def
BASE: President  mod: CompanyB<Company>  SPEC: def
BASE: CEO  mod: CompanyB<Company>  SPEC: def
BASE: WOMAN  mod: first  mod: CompanyB<Company>  SPEC: def
BASE: personality  mod: TV  SPEC: none

FIG. 7

DESCRIPTOR UNIQUENESS FOR ENTITY CLUSTERING

BACKGROUND

The present application relates generally to an improved data processing apparatus and method and more specifically to mechanisms for identifying uniqueness of description phrases in order to support entity clustering.

Natural language processing (NLP) is a subfield of linguistics, computer science, information engineering, and artificial intelligence concerned with the interactions between computers and human (natural) languages, in particular how to program computers to process and analyze large amounts of natural language data. Challenges in natural language processing frequently involve speech recognition, natural language understanding, and natural language generation.

Named-entity recognition (NER) (also known as entity identification, entity chunking, and entity extraction) is a subtask of information extraction that seeks to locate and classify named entities mentioned in unstructured text into pre-defined categories such as person names, organizations, locations, medical codes, time expressions, quantities, monetary values, percentages, etc. Most research on NER systems has been structured as taking an unannotated block of text and producing an annotated block of text that highlights the names of entities.

An NLP system may encounter two or more entities that actually relate to the same person or thing. Entity clustering can merge these entities into one. Merging means that one entity (the "merge" entity) inherits the links from other entities transferred to it, and then those other entities are deleted. Only entities of the same type can be merged.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided in a data processing system comprising a processor and a memory, the memory comprising instructions that are executed by the processor to specifically configure the processor to implement a cognitive natural language processing (NLP) system with descriptor uniqueness identification to support named entity mention clustering. The method comprises annotating a set of documents from a corpus of documents for entity types and mentions; collecting descriptor usages from all documents in the corpus of documents; analyzing the descriptor usages to classify the descriptors as base terms or modifier terms; generating compatibility scores for the descriptors; and performing entity merging of entity clusters based on the compatibility scores.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Mapping person names to roles is important for natural language processing (NLP) systems in several use cases. For example, answering a question, such as "who was the backup quarterback of TeamA in 2018?" requires mapping the descriptor "backup quarterback, TeamA, 2018" to a particular person. It is also useful for merging name mentions into distinct clusters for many cross-document understanding and retrieval use cases. For example, if in one document Jane Smith is described as the President and CEO of CompanyA and in another document Jane Smith is described as the President of a clinical gerontology association, are those mentions of Jane Smith likely to be referring to the same person?

Many prior art approaches to entity merging rely on clues external to the descriptors, such as birthdates, locations of events combined with temporal reasoning, or other relationships, such as home address. The prior art approaches are for large-scale coreference resolution. These approaches rely on within-document antecedent chains rather than developing an external resource of descriptor combination compatibility. As is the case for most large-scale semantic processors, these methods rely solely on open-class words such as adjectives and ignore the signal from functional words such as determiners or other uniqueness markings.

The illustrative embodiments provide a system for identifying uniqueness of description phrases in order to support entity clustering. The system of the illustrative embodiments uses a large open domain corpus of documents. Optionally, the system uses an additional domain-specific corpus of text documents. An entity tagger is run over the documents within the corpora. The system annotates a document collection for entity types/mentions. The system collects descriptor usages from all documents in the corpus and removes context dependent descriptor terms (e.g., anaphoric definites). The system then analyzes the collected descriptors into base terms and modifier terms with associated semantic restrictions. The system builds a frequency count of descriptor co-occurrences (token level language model). Using document initial mentions, the system builds a list of specificity markers indicating which mentions carry a signal as a definiteness marker in English and constructs a compatibility score of descriptor combinations under each definiteness condition. Then, the system uses the compatibility score for merging of entity clusters.

Before beginning the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
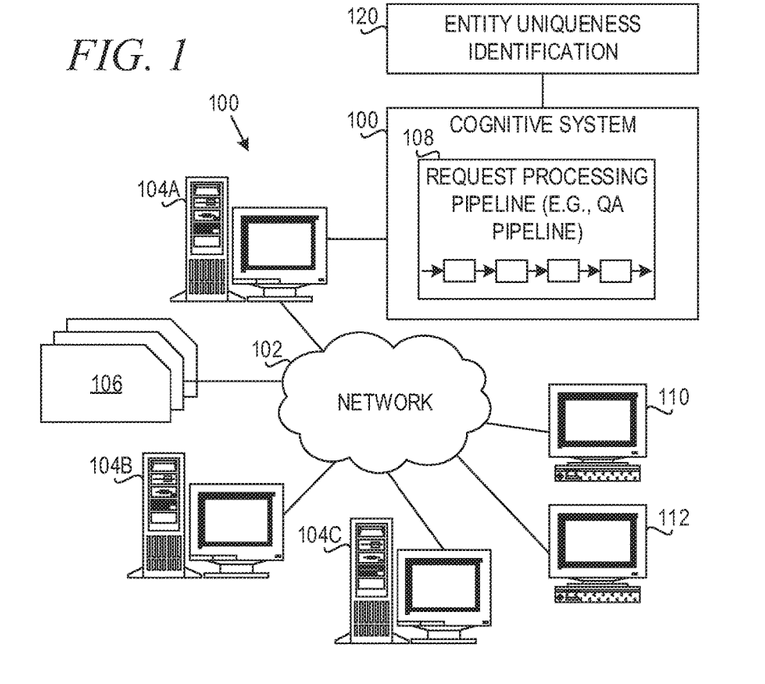
FIG. 1 depicts a schematic diagram of one illustrative embodiment of a cognitive healthcare system in a computer network.
Figure 2:
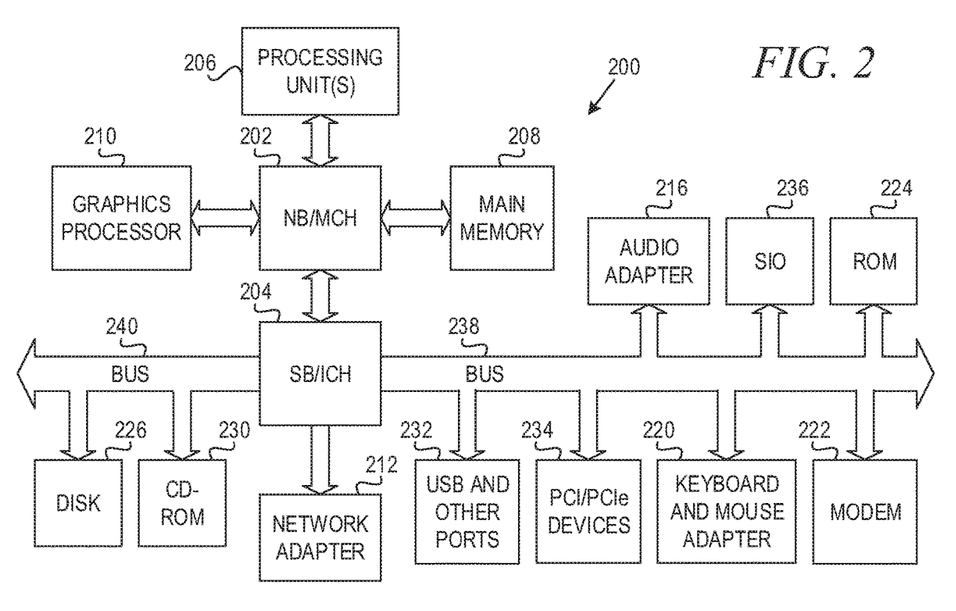
FIG. 2 is a block diagram of an example data processing system in which aspects of the illustrative embodiments are implemented.
Figure 3:
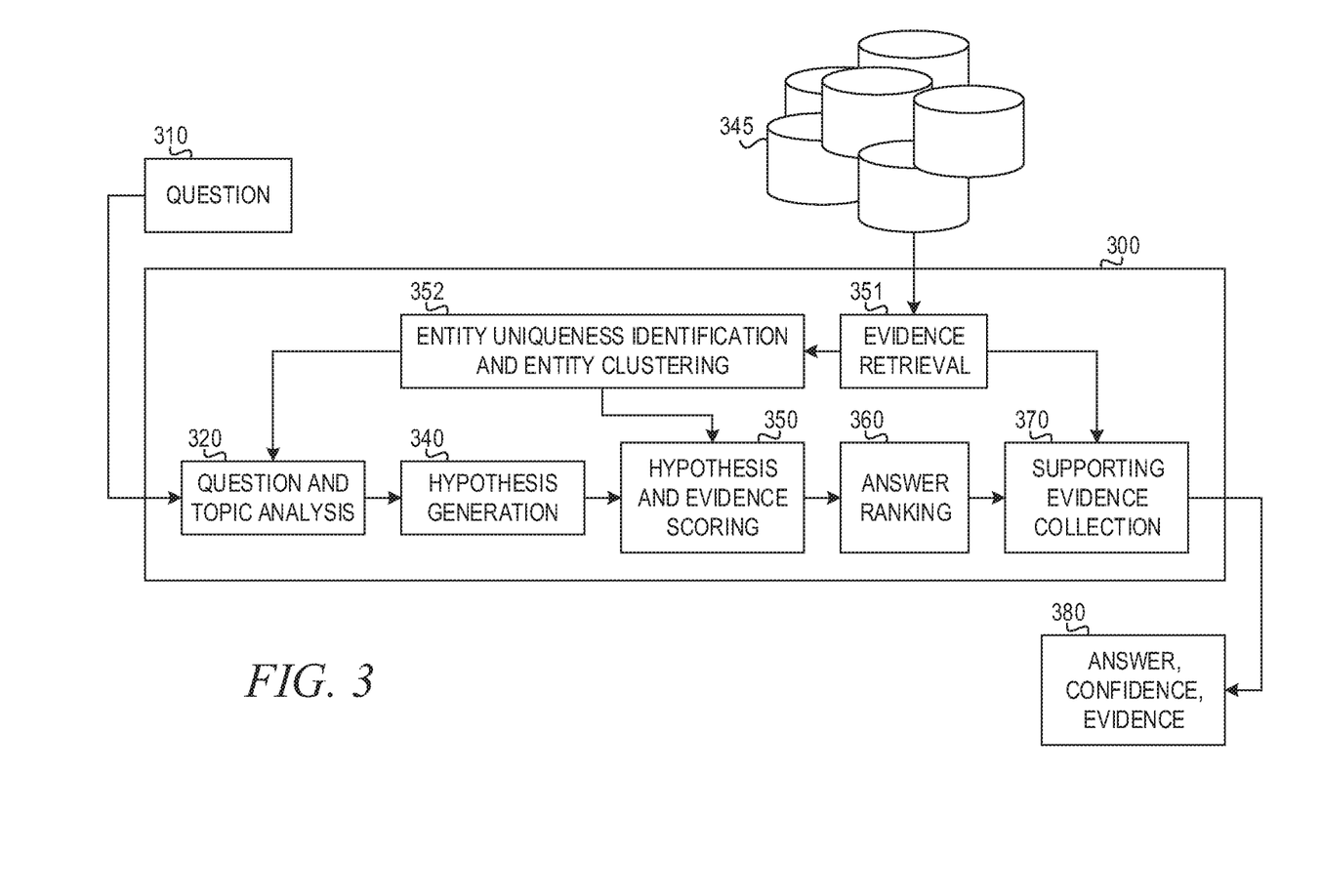
FIG. 3 illustrates a question answering pipeline for processing an input question in accordance with one illustrative embodiment.

As noted above, the present invention provides mechanisms for identifying descriptor uniqueness for entity clustering. The illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIG. 1 is directed to describing an example cognitive system that implements a request processing pipeline, request processing methodology, and request processing computer program product with which the mechanisms of the illustrative embodiments are implemented. These requests may be provided as structured or unstructured request messages, or any other suitable format for requesting an operation to be performed by the conversational system.

It should be appreciated that the cognitive system, while shown as having a single request processing pipeline in the examples hereafter, may in fact have multiple request processing pipelines. Each request processing pipeline may be separately trained and/or configured to process requests associated with different domains or be configured to perform the same or different analysis on input requests, depending on the desired implementation. For example, in some cases, a first request processing pipeline may be trained to operate on input requests directed to a question answering system. In other cases, for example, the request processing pipelines may be configured to provide different types of cognitive functions or support different types of applications, such as one request processing pipeline being used for providing a clinical decision support system, a patient monitoring system, an intelligent assistant, etc.

Moreover, each request processing pipeline may have its own associated corpus or corpora that they ingest and operate on, e.g., one corpus for medical documents and another corpus for financial domain related documents in the above examples. In some cases, the request processing pipelines may each operate on the same domain of input questions but may have different configurations, e.g., different annotators or differently trained annotators, such that different analysis and potential answers are generated. The cognitive system may provide additional logic for routing input questions to the appropriate request processing pipeline, such as based on a determined domain of the input request, combining and evaluating final results generated by the processing performed by multiple request processing pipelines, and other control and interaction logic that facilitates the utilization of multiple request processing pipelines.

As noted above, one type of request processing pipeline with which the mechanisms of the illustrative embodiments may be utilized is a Question Answering (QA) pipeline. The description of example embodiments of the present invention hereafter will utilize a QA pipeline as an example of a request processing pipeline that may be augmented to include mechanisms in accordance with one or more illustrative embodiments. It should be appreciated that while the present invention will be described in the context of the cognitive system implementing one or more QA pipelines that operate on an input question, the illustrative embodiments are not limited to such. Rather, the mechanisms of the illustrative embodiments may operate on requests that are not posed as "questions" but are formatted as requests for the cognitive system to perform cognitive operations on a specified set of input data using the associated corpus or corpora and the specific configuration information used to configure the cognitive system. It should be appreciated that the mechanisms of the QA system pipeline may operate on requests in a similar manner to that of input natural language questions with minor modifications. In fact, in some cases, a request may be converted to a natural language question for processing by the QA system pipelines if desired for the implementation.

As will be discussed in greater detail hereafter, the illustrative embodiments may be integrated in, augment, and extend the functionality of these mechanisms of a conversational system regarding descriptor uniqueness identification for entity clustering. Thus, it is important to first have an understanding of how cognitive systems are implemented before describing how the mechanisms of the illustrative embodiments are integrated in and augment such cognitive systems and request processing pipeline mechanisms. It should be appreciated that the mechanisms described in FIG. 1 are only examples and are not intended to state or imply any limitation regarding the type of cognitive system mechanisms with which the illustrative embodiments are implemented. Many modifications to the example cognitive system shown in FIG. 1 may be implemented in various embodiments of the present invention without departing from the spirit and scope of the present invention.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas, which when combined with the inherent strengths of digital computing, can solve problems with high accuracy and resilience on a large scale. A cognitive system performs one or more computer-implemented cognitive operations that approximate a human thought process as well as enable people and machines to interact in a more natural manner to extend and magnify human expertise and cognition. A cognitive system comprises artificial intelligence logic, such as natural language processing (NLP) based logic, for example, and machine learning logic, which may be provided as specialized hardware, software executed on hardware, or any combination of specialized hardware and software executed on hardware. The logic of the cognitive system implements the cognitive operation(s), examples of which include, but are not limited to, question answering, identification of related concepts within different portions of content in a corpus, intelligent search algorithms, such as Internet web page searches, for example, medical diagnostic and treatment recommendations, and other types of recommendation generation, e.g., items of interest to a particular user, potential new contact recommendations, or the like.

IBM Watson™ is an example of one such cognitive system that can process human readable language and identify inferences between text passages with human-like high accuracy at speeds far faster than human beings and on a larger scale. In general, such cognitive systems are able to perform the following functions: navigate the complexities of human language and understanding; ingest and process vast amounts of structured and unstructured data; generate and evaluate hypothesis; weigh and evaluate responses that arc based only on relevant evidence; provide situation-specific advice, insights, and guidance; improve knowledge and learn with each iteration and interaction through machine learning processes; enable decision making at the point of impact (contextual guidance); scale in proportion to the task; extend and magnify human expertise and cognition; identify resonating, human-like attributes and traits from natural language; deduce various language specific or agnostic attributes from natural language; high degree of relevant recollection from data points (images, text, voice) (memorization and recall); predict and sense with situational awareness that mimic human cognition based on experiences; and answer questions based on natural language and specific evidence.

In one aspect, cognitive systems provide mechanisms for answering questions posed to these cognitive systems using a Question Answering pipeline or system (QA system) and/or process requests that may or may not be posed as natural language questions. The QA pipeline or system is an artificial intelligence application executing on data processing hardware that answers questions pertaining to a given subject-matter domain presented in natural language. The QA pipeline receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA pipeline. The document may include any file, text, article, or source of data for use in the QA system. For example, a QA pipeline accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to cognitive system which implements the QA pipeline, which then answers the input questions using the content in the corpus of data by evaluating documents, sections of documents, portions of data in the corpus, or the like. When a process evaluates a given section of a document for semantic content, the process can use a variety of conventions to query such document from the QA pipeline, e.g., sending the query to the QA pipeline as a well-formed question, which is then interpreted by the QA pipeline and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the QA pipeline receives an input question, parses the question to extract the major features of the question, uses the extracted features to formulate queries, and then applies those queries to the corpus of data. Based on the application of the queries to the corpus of data, the QA pipeline generates a set of hypotheses, or candidate answers to the input question, by looking across the corpus of data for portions of the corpus of data that have some potential for containing a valuable response to the input question. The QA pipeline then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA pipeline. The statistical model is used to summarize a level of confidence that the QA pipeline has regarding the evidence that the potential response, i.e. candidate answer, is inferred by the question. This process is repeated for each of the candidate answers until the QA pipeline identifies candidate answers that surface as being significantly stronger than others and thus, generates a final answer, or ranked set of answers, for the input question.

FIG. 1 depicts a schematic diagram of one illustrative embodiment of a cognitive system 100 implementing a request processing pipeline 108 in a computer network 102. The cognitive system 100 is implemented on one or more computing devices 104A-C (comprising one or more processors and one or more memories, and potentially any other computing device elements generally known in the art including buses, storage devices, communication interfaces, and the like) connected to the computer network 102. For purposes of illustration only, FIG. 1 depicts the cognitive system 100 being implemented on computing device 104A only, but as noted above the cognitive system 100 may be distributed across multiple computing devices, such as a plurality of computing devices 104A-C. The network 102 includes multiple computing devices 104A-C, which may operate as server computing devices, and computing devices 110-112, which may operate as client computing devices, in communication with each other and with other devices or components via one or more wired and/or wireless data communication links, where each communication link comprises one or more of wires, routers, switches, transmitters, receivers, or the like. In some illustrative embodiments, the cognitive system 100 and network 102 may provide cognitive operations including, but not limited to, request processing and cognitive response generation which may take many different forms depending upon the desired implementation, e.g., cognitive information retrieval, training/instruction of users, cognitive evaluation of data, or the like. Other embodiments of the cognitive system 100 may be used with components, systems, sub-systems, and/or devices other than those that are depicted herein.

The cognitive system 100 is configured to implement a request processing pipeline 108 that receive inputs from various sources. The requests may be posed in the form of a natural language question, natural language request for information, natural language request for the performance of a cognitive operation, or the like, and the answer may be returned in a natural language format maximized for efficient comprehension. For example, the cognitive system 100 receives input from the network 102, a corpus or corpora of electronic documents 106, cognitive system users, and/or other data and other possible sources of input. In one embodiment, some or all of the inputs to the cognitive system 100 are routed through the network 102. The various computing devices 104A-C on the network 102 include access points for content creators and cognitive system users. Some of the computing devices 104A-C include devices for a database storing the corpus or corpora of data 106 (which is shown as a separate entity in FIG. 1 for illustrative purposes only). Portions of the corpus or corpora of data 106 may also be provided on one or more other network attached storage devices, in one or more databases, or other computing devices not explicitly shown in FIG. 1. The network 102 includes local network connections and remote connections in various embodiments, such that the cognitive system 100 may operate in environments of any size, including local and global, e.g., the Internet.

The cognitive system 100 implements the pipeline 108 which comprises a plurality of stages for processing an input question/request based on information obtained from the corpus or corpora of data 106. The pipeline 108 generates answers/responses for the input question or request based on the processing of the input question/request and the corpus or corpora of data 106. The pipeline 108 will be described in greater detail hereafter with reference to FIG. 3.

As shown in FIG. 1, the cognitive system 100 is further augmented, in accordance with the mechanisms of the illustrative embodiments, to include logic implemented in specialized hardware, software executed on hardware, or any combination of specialized hardware and software executed on hardware, for entity uniqueness identification engine 120 for using an unsupervised data-driven approach to identify uniqueness markers in entity descriptors and exploiting unique descriptors identified in that manner for merging entity clusters.

As noted above, the mechanisms of the illustrative embodiments are rooted in the computer technology arts and are implemented using logic present in such computing or data processing systems. These computing or data processing systems are specifically configured, either through hardware, software, or a combination of hardware and software, to implement the various operations described above. As such, FIG. 2 is provided as an example of one type of data processing system in which aspects of the present invention may be implemented. Many other types of data processing systems may be likewise configured to specifically implement the mechanisms of the illustrative embodiments.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which implements a cognitive system 100 augmented to include the additional mechanisms of the illustrative embodiments described hereafter.

In the depicted example, data processing system 200 employs a hub architecture including North Bridge and Memory Controller Hub (NB/MCH) 202 and South Bridge and Input/Output (I/O) Controller Hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 10®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer® System P® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a question answering pipeline for processing an input question in accordance with one illustrative embodiment. The question answering (QA) system pipeline of FIG. 3 may be implemented, for example, as request processing pipeline 108 of cognitive system 100 in FIG. 1. It should be appreciated that the stages of the NL processing system pipeline shown in FIG. 3 are implemented as one or more software engines, components, or the like, which are configured with logic for implementing the functionality attributed to the stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The NL system pipeline of FIG. 3 is augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

In the depicted example, NL system pipeline 300 is implemented in a Question Answering (QA) system. The description that follows refers to the NL system pipeline or the NL system pipeline as a QA system; however, aspects of the illustrative embodiments may be applied to other NL processing systems, such as Web search engines that return semantic passages from a corpus of documents.

As shown in FIG. 3, the NL system pipeline 300 comprises a plurality of stages 310-390 through which the NL system operates to analyze an input question and generate a final response. In an initial question input stage, the NL system receives an input question 310 that is presented in a natural language format. That is, a user inputs, via a user interface, an input question 310 for which the user wishes to obtain an answer, e.g., "Who were Washington's closest advisors?" In response to receiving the input question 310, the next stage of the NL system pipeline 300, i.e. the question and topic analysis stage 320, analyzes the input question using natural language processing (NLP) techniques to extract major elements from the input question, and classify the major elements according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. For example, in the question "What maneuver was invented in the 1500s to speed up the game and involves two pieces of the same color?," the LAT is the string "maneuver." The focus of a question is the part of the question that, if replaced by the answer, makes the question a standalone statement. For example, in the question "What drug has been shown to relieve the symptoms of attention deficit disorder with relatively few side effects?," the focus is "What drug" since if this phrase were replaced with the answer it would generate a true sentence, e.g., the answer "Adderall" can be used to replace the phrase "What drug" to generate the sentence "Adderall has been shown to relieve the symptoms of attention deficit disorder with relatively few side effects." The focus often, but not always, contains the LAT. On the other hand, in many cases it is not possible to infer a meaningful LAT from the focus.

Referring again to FIG. 3, the identified major elements of the question are then used during a hypothesis generation stage 340 to decompose the question into one or more search queries that are applied to the corpora of data/information 345 in order to generate one or more hypotheses. The queries are applied to one or more text indexes storing information about the electronic texts, documents, articles, websites, and the like, that make up the corpus of data/information, e.g., the corpus of data 106 in FIG. 1. The queries are applied to the corpus of data/information at the hypothesis generation stage 340 to generate results identifying potential hypotheses for answering the input question, which can then be evaluated. That is, the application of the queries results in the extraction of portions of the corpus of data/information matching the criteria of the query. These portions of the corpus are then analyzed and used in the hypothesis generation stage 340, to generate hypotheses for answering the input question 310. These hypotheses are also referred to herein as "candidate answers" for the input question. For any input question, at this stage 340, there may be hundreds of hypotheses or candidate answers generated that may need to be evaluated.

The NL system pipeline 300, in stage 350, then performs a deep analysis and comparison of the language of the input question and the language of each hypothesis or "candidate answer," as well as performs evidence scoring to evaluate the likelihood that the particular hypothesis is a correct answer for the input question. This involves evidence retrieval 351, which retrieves passages from corpora 345.

Entity uniqueness identification and entity clustering component 352 uses an unsupervised data-driven approach to identify uniqueness markers in entity descriptors and exploits unique descriptors identified in that manner for merging entities. Entity uniqueness identification and entity clustering component 352 may process entities from documents retrieved from corpus 345 or from the input question 310. Thus, entity uniqueness identification and entity clustering component 352 may be implemented within or in communication with question and topic analysis stage 320 or hypothesis and evidence scoring stage 350.

Entity uniqueness identification and entity clustering component 352 uses a large open domain corpus of documents. Optionally, entity uniqueness identification and entity clustering component 352 uses an additional domain-specific corpus of text documents. An entity tagger is run over the documents within the corpora. Entity uniqueness identification and entity clustering component 352 annotates a document collection for entity types/mentions. Entity uniqueness identification and entity clustering component 352 collects descriptor usages from all documents in the corpus and removes context dependent descriptor terms (e.g., anaphoric definites). Entity uniqueness identification and entity clustering component 352 then analyzes the collected descriptors into base terms and modifier terms with associated semantic restrictions. Entity uniqueness identification and entity clustering component 352 builds a frequency count of descriptor co-occurrences (token level language model). Using document initial mentions, entity uniqueness identification and entity clustering component 352 builds a list of specificity markers indicating which mentions carry a signal as a definiteness marker in English and constructs a compatibility score for descriptors. Then, entity uniqueness identification and entity clustering component 352 uses the compatibility score for merging of entity clusters.

Hypothesis and evidence scoring phase 350 uses a plurality of scoring algorithms, each performing a separate type of analysis of the language of the input question and/or content of the corpus that provides evidence in support of, or not in support of, the hypothesis. Each scoring algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the analysis being performed. In general, however, these algorithms look for terms, phrases, or patterns of text that are indicative of terms, phrases, or patterns of interest and determine a degree of matching with higher degrees of matching being given relatively higher scores than lower degrees of matching.

For example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

In one example there may be several proposed candidate answers that are possible movie titles. The title "The Horse in Motion" and "The Jazz Singer" and "The Stride of a horse" surface as proposed answer entities. In one step of the answer hypothesis generation, identical entities that surface under different names will be merged using the compatibility score that results from the frequency count of descriptor co-occurrences constructed as above. For example, 'A groundbreaking innovation' and 'the first image sequence' descriptor combinations may be used on different documents relating to the movie titles 'The Horse in Motion" and "The Stride of a horse," yet the descriptions are judged to be compatible. This allows these two overtly different movie titles to be merged into one cluster as a candidate answer. In a different corpus, if the descriptor "A Grammy Award Winner" and "A Prizewinning documentary" are found as descriptors for an identical title, the compatibility resource would indicate that these descriptors are incompatible and the two clusters would not be merged.

It should be appreciated that this is just one simple example of how scoring can be performed. Many other algorithms of various complexities may be used to generate scores for candidate answers and evidence without departing from the spirit and scope of the present invention.

In answer ranking stage 360, the scores generated by the various scoring algorithms are synthesized into confidence scores or confidence measures for the various hypotheses. This process involves applying weights to the various scores, where the weights have been determined through training of the statistical model employed by the QA system and/or dynamically updated. For example, the weights for scores generated by algorithms that identify exactly matching terms and synonyms may be set relatively higher than other algorithms that evaluate publication dates for evidence passages.

The weighted scores are processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question.

The resulting confidence scores or measures are processed by answer ranking stage 360, which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers").

Supporting evidence collection phase 370 collects evidence that supports the candidate answers from answer ranking phase 360. From the ranked listing of candidate answers in stage 360 and supporting evidence from supporting evidence collection stage 370, NL system pipeline 300 generates a final answer, confidence score, and evidence, or final set of candidate answers with confidence scores and supporting evidence, and outputs answer, confidence, and evidence 390 to the submitter of the original input question 310 via a graphical user interface or other mechanism for outputting information.

Figure 4:
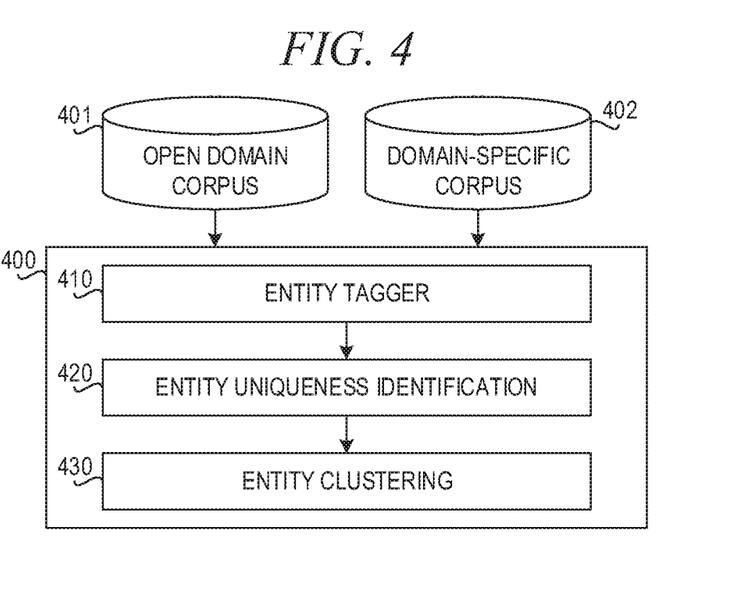
FIG. 4 is a block diagram of an entity uniqueness identification and entity clustering engine in accordance with an illustrative embodiment.

FIG. 4 is a block diagram of an entity uniqueness identification and entity clustering engine in accordance with an illustrative embodiment. The entity uniqueness identification and entity clustering engine 400 receives a large open-domain corpus of text documents 401 and optionally receives an additional domain-specific corpus of text documents 402. Entity tagger 410 runs over the documents within corpora 401, 402 to generate descriptors of identified entities and descriptors within the text of the documents. Entity tagger 410 may be the IBM developed Statistical Information and Relation Extraction (SIRE) toolkit, for example.

Consider the following three sample texts to be processed by the entity uniqueness identification component 420 of the illustrative embodiment:

1) "PersonA (born on <date>) is an American business executive. She is the Chairman, President and CEO of CompanyA and the first woman to head the company."

2) "Football star and TV personality PersonB <verb phrase>."

3) "PersonC is a mother of four and became the CEO of CompanyB in <year>."

Entity uniqueness identification component 420 identifies uniqueness of description phrases in order to support entity clustering by entity clustering component 430. Entity uniqueness identification component 420 starts with a large broad-coverage document collection and possibly one for the domain and an entity-type tagger 410. In some embodiments, each text level entity mention is replaced with its corresponding entity type, e.g., a person's name is replaced with "PERSON."

Entity uniqueness identification 420 collects descriptor usages from all documents in the corpus 401. Descriptors may be in many grammatical constructions:

a. Copula: "PERSON is a mother of four and CEO of CompanyB."

b. Pre-nominal: "Football star and TV personality PersonB <verb phrase>."

c. Sentence-initial adverbial: "Prior to becoming a beloved TV news anchor, PersonD worked as a truck driver . . . "

d. Appositive: PersonE, <year> Canadian Inventor of the Year, <verb phrase>."

Entity uniqueness identification component 420 removes context dependent descriptor terms (e.g., anaphoric definites). Using coreference process, entity uniqueness identification component 420 excludes reduced or context-dependent references, such as "the chair" when its semantic value must be disambiguated in context. The semantic type of "chair" is ambiguous, and also the definiteness marker "the" in this case is indicating that the reference is in focus rather than that only one chair exists. This is why this step removes all but document-initial mentions.

Figure 5:
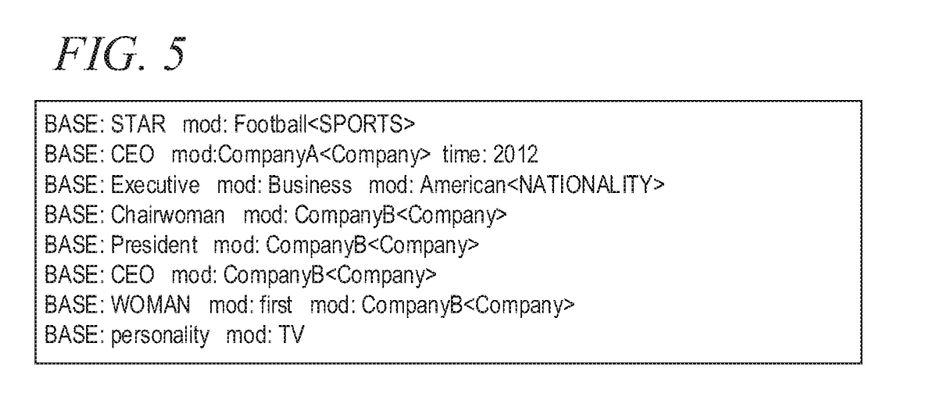
FIG. 5 illustrates an example collection of descriptors analyzed into base terms and modifier terms in accordance with an illustrative embodiment.

Entity uniqueness identification component 420 analyzes collected descriptors into base terms and modifier terms with associated semantic restrictions. FIG. 5 illustrates an example collection of descriptors analyzed into base terms and modifier terms in accordance with an illustrative embodiment. For example, the base term "STAR" is modified by "Football<SPORTS>"; however, in a different example, the base term "STAR" cold be modified by "television," "movie," or the like. In the example depicted in FIG. 5, the base terms "CEO," "Chairwoman," and "President" are modified by company names of type <Company>. In the depicted example, the base term "Executive" is modified by both "Business" and "American<NATIONALITY>."

Entity uniqueness identification component 420 then builds a frequency count of descriptor co-occurrences (~token level language model). For instance, in the examples shown above, the following frequency counts result:

star & personality increment by 1
Football star & TV personality increment by 1
CEO & Chairwoman increment by 1
CEO & mother increment by 1

Figure 6:
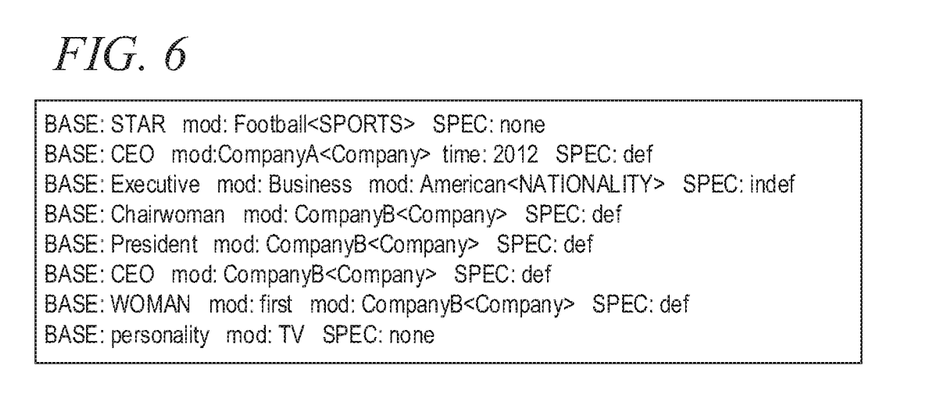
FIG. 6 illustrates an example collection of descriptors analyzed into base terms and modifier terms with specificity markers in accordance with an illustrative embodiment.

Entity uniqueness identification component 420 uses document initial mentions to build a list of specificity markers indicating which mentions carry a uniqueness signal, such as a definiteness marker in English. FIG. 6 illustrates an example collection of descriptors analyzed into base terms and modifier terms with specificity markers in accordance with an illustrative embodiment. In the depicted example, "football star" and "TV personality" have specificity markers of "none," because these terms are not specific. The example of "American business executive" has a specificity marker of "indef," because the term is indefinite. It is unclear if this term is unique. On the other hand, the base term "CEO" has a specificity marker of "def," because at a given time there is only one CEO of a given company, making these terms definite. The terms "Chairwoman" and "President" have a specificity marker of "def" for similar reasons. The example of "first woman" has a specificity marker of "def," because it is a superlative. Only one person can be the first woman to achieve a given title with a given company.

Entity uniqueness identification component 420 constructs a compatibility score for descriptors, making use of a rule-based scorer with a taxonomy/synonym resource or a trained statistical scorer. The input is two or more descriptions. The output may be a binary indicator for compatible/incompatible, a ternary indicator for identical/compatible/incompatible, or a real-valued score such that a negative score, for example, indicates incompatibility and a positive score indicates compatibility, with larger magnitude scores indicating strength of determination or confidence.

These descriptions are uniquely compatible: "The CEO of CompanyA" and "The Chief Executive Officer of CompanyA" (synonymous modifier, learned uniqueness of descriptions). These descriptions are compatible: "the CEO of CompanyA" (unique descriptor), "an American CEO" (nationality modifier does not conflict, CEO matches), "an American business executive" (business executive is a hypernym of CEO), and "a business executive" (removing a nationality modifier does not conflict). These descriptions are incompatible: "The CEO of CompanyA" and "The CFO of CompanyA" (a non-synonymous modifier: CEO!=CFO, learned uniqueness of descriptions). These descriptions are incompatible: "The CEO of CompanyA" and "The CEO of CompanyB" (a non-synonymous modifier: CompanyA!=CompanyB, learned uniqueness of descriptions). The following descriptions are also incompatible: "An American business executive" and "A Portuguese business executive" (a non-synonymous nationality modifier: American!=Portuguese).

In some embodiments, a temporal argument may be provided for calculating compatibility. "A Senior Vice President of CompanyA in 2005" is compatible with "The CEO of CompanyA in 2019," because the same person could match both descriptions due to the temporal argument.

Entity clustering component 430 then uses the compatibility score for merging of entity clusters. If descriptions are uniquely compatible, then merging should be assured. If descriptions are incompatible, then merging should be blocked or made highly unlikely. If descriptions are compatible, then merging can be encouraged to a non-determining degree. The compatibility scores output by entity uniqueness identification component 420 can be used as inputs to a model of entity merging or clustering. This may be a classification model, a distance-based clustering model, or another type of decision model. One technique for merging candidate named-entity mentions into an identity cluster is Markov Chain Monte Carlo based inference.

Figure 7:
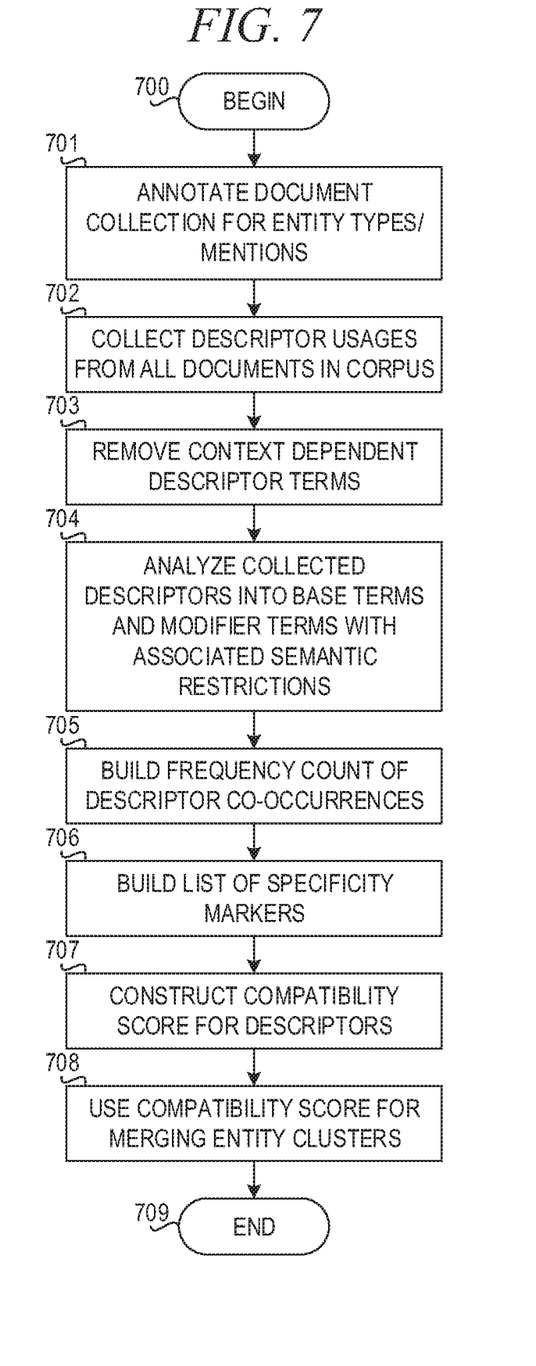
FIG. 7 is a flowchart illustrating operation of a mechanism for entity uniqueness identification and entity clustering in accordance with an illustrative embodiment.

FIG. 7 is a flowchart illustrating operation of a mechanism for entity uniqueness identification and entity clustering in accordance with an illustrative embodiment. Operation begins (block 700), and the mechanism annotates a document collection for entity types/mentions (block 701). The mechanism collects descriptor usages from all documents in the corpus (block 702). The mechanism then removes context dependent descriptor terms (block 703).

The mechanism analyzes the collected descriptors into base terms and modifier terms with associated semantic restrictions (block 704). The mechanism builds a frequency count of descriptor co-occurrences (block 705) and builds a list of specificity markers (block 706). The mechanism then determines a compatibility score for descriptors (block 707). Next, the mechanism uses the compatibility scores for merging entity clusters (block 708), and operation ends (block 709).

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication-based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory, the memory comprising instructions that are executed by the processor to specifically configure the processor to implement a cognitive question answering (QA) system with descriptor uniqueness identification to support named entity mention clustering, the method comprising:

receiving, by an entity uniqueness identification and entity clustering engine executing within the cognitive QA system, an open-domain. corpus of text. documents and a domain-specific corpus of text documents;

annotating, by an entity tagger within the entity uniqueness and entity clustering engine, a set of documents from the open-domain corpus of text documents and the domain-specific corpus of text documents for entity types and mentions;

collecting, by an entity uniqueness identification component within the entity uniqueness and entity clustering engine, descriptor usages of descriptors from all documents in the open-domain corpus of text documents;

analyzing, by the entity uniqueness identification component, the descriptor usages to classify the descriptors as base terms or modifier terms;

building, by the entity uniqueness identification component, a frequency count of descriptor co-occurrences:

generating, by the entity uniqueness identification component, specificity markers for the descriptors, wherein each specificity marker specifies whether the uniqueness of the corresponding descriptor is definite or indefinite;

generating, by the entity uniqueness identification component, compatibility scores for combinations of the descriptors based on the frequency counts of descriptor co-occurrences and the specificity markers for the descriptors, wherein the compatibility scores comprise real-valued scores such that a negative score indicates incompatibility and a positive score indicates compatibility, with larger magnitude scores indicating strength of determination or confidence;

performing, by an entity clustering component within the entity uniqueness and entity clustering engine, entity merging of entity clusters based on the compatibility scores; and generating, by the cognitive QA system, a set of candidate answers from passages within the domain-specific corpus of text documents for an input question based on results of the entity merging of entity clusters.

2. The method of claim 1, further comprising removing context dependent descriptor terms.

3. The method of claim 1, wherein annotating the set of documents comprises replacing each text-level mention with its corresponding entity type.

4. The method of claim 1, wherein each description is in a grammatical construction selected from the group consisting of copula, pre-nominal, sentence-initial adverbial, and appositive.

5. The method of claim 1, wherein generating compatibility scores for the descriptors comprises using a rule-based scorer with a taxonomy and synonym resource.

6. The method of claim 1, wherein generating compatibility scores for the descriptors comprises using a trained statistical scorer.

7. The method of claim 1, wherein performing entity merging comprises using a classification model, a distance-based model, or a Markov Chain Monte Carlo based inference model.

8. A computer program product comprising a computer readable storage medium having a computer readable program stored therein, wherein the computer readable program comprises instructions, which when executed on a processor of a computing device causes the computing device to implement a cognitive question answering (QA) system with descriptor uniqueness identification to support named entity mention clustering, wherein the computer readable program causes the computing device to:

receive, by an entity uniqueness identification and entity clustering engine executing within the cognitive QA system, an open-domain corpus of text documents and a domain-specific corpus of text documents;

annotate, by an entity tagger within the entity uniqueness and entity clustering engine, a set of documents from the open-domain corpus of text documents and the domain-specific corpus of text documents for entity types and mentions;

collect, by an entity uniqueness identification component within the entity uniqueness and entity clustering engine, descriptor usages of descriptors from all documents in the open-domain corpus of text documents;

analyze, by the entity uniqueness identification component, the descriptor usages to classify the descriptors as base terms or modifier terms;

build, by the entity uniqueness identification component, a frequency count of descriptor co-occurrences;

generate, by the entity uniqueness identification component, specificity markers for the descriptors, wherein each specificity marker specifies whether the uniqueness of the corresponding descriptor is definite or indefinite;

generate, by the entity uniqueness identification component, compatibility scores for combinations of the descriptors based on the frequency counts of descriptor co-occurrences and the specificity markers for the descriptors, Wherein the compatibility scores comprise real-valued scores such that a negative score indicates incompatibility and a positive score indicates compatibility, with larger magnitude scores indicating strength of determination or confidence;

perform, by an entity clustering component within the entity uniqueness and entity clustering engine, entity merging of entity clusters based on the compatibility scores; and generate, by the cognitive QA system, a set of candidate answers from passages within the domain-specific corpus of text documents for an input question based on results of the entity merging of entity clusters.

9. The computer program product of claim 8, wherein the computer readable program causes the computing device to remove context dependent descriptor terms.

10. The computer program product of claim 8, wherein annotating the set of documents comprises replacing each text-level mention with its corresponding entity type.

11. The computer program product of claim 8, wherein each description is in a grammatical construction selected from the group consisting of copula, pre-nominal, sentence-initial adverbial, and appositive.

12. The computer program product of claim 8, wherein generating compatibility scores for the descriptors comprises using a rule-based scorer with a taxonomy and synonym resource.

13. The computer program product of claim 8, wherein generating compatibility scores for the descriptors comprises using a trained statistical scorer.

14. A computing device comprising:
a processor; and
a memory coupled to the processor, wherein the memory comprises instructions, which when executed on a processor of a computing device causes the computing device to implement a cognitive question answering (QA) system with descriptor uniqueness identification to support named entity mention clustering, wherein the instructions cause the processor to:
receive, by an entity uniqueness identification and entity clustering engine executing within the cognitive QA system, an open-domain corpus of text documents and a domain-specific corpus of text documents;
annotate, by an entity tagger within the entity uniqueness and entity clustering engine, a set of documents from the open-domain corpus of text documents and the domain-specific corpus of text documents for entity types and mentions;
collect, by an entity uniqueness identification component within the entity uniqueness and entity clustering engine, descriptor usages of descriptors from all documents in the open-domain corpus of text documents;

analyze, by the entity uniqueness identification component, the descriptor usages to classify the descriptors as base terms or modifier terms;

build, by the entity uniqueness identification component, a frequency count of descriptor co-occurrences;

generate, by the entity uniqueness identification component, specificity markers for the descriptors, wherein each specificity marker specifies whether the uniqueness of the corresponding descriptor is definite or indefinite generate, by the entity uniqueness identification component, compatibility scores for combinations of the descriptors based on the frequency counts of descriptor co occurrences and the specificity markers for the descriptors, wherein the compatibility scores comprise real-valued scores such that a negative score indicates incompatibility and a positive score indicates compatibility, with larger magnitude scores indicating strength of determination or confidence;

perform, by an entity clustering component within the entity uniqueness and entity clustering engine, entity merging of entity clusters based on the compatibility scores; and generate, by the cognitive QA system, a set of candidate answers from passages within the domain-specific corpus of text documents for an input question based on results of the entity merging of entity clusters.

15. The method of claim 1, wherein generating the set of candidate answers comprises analyzing, by a question and topic analysis stage of the cognitive QA system, the input question using natural language processing (NLP) techniques to extract major elements from the input question based on results of the entity merging of entity clusters.

16. The method of claim 1, wherein generating the set of candidate answers comprises:
performing, by a hypothesis and evidence scoring stage of the cognitive QA system, a comparison of language of the input question and language of each candidate answer based on results of the entity merging of entity clusters; and
performing, by the hypothesis and evidence scoring stage, evidence scoring to evaluate a likelihood that each candidate answer is a correct answer for the input question based on results of the entity merging of entity clusters.

17. The computer program product of claim 8, wherein performing entity merging comprises using a classification model, a distance-based model, or a Markov Chain Monte Carlo based inference model.

18. The computer program product of claim 8, wherein generating the set of candidate answers comprises analyzing, by a question and topic analysis stage of the cognitive QA system, the input question using natural language processing (NLP) techniques to extract major elements from the input question based on results of the entity merging of entity clusters.

19. The computer program product of claim 8, wherein generating the set of candidate answers comprises:
performing, by a hypothesis and evidence scoring stage of the cognitive QA system, a comparison of language of the input question and language of each candidate answer based on results of the entity merging of entity clusters; and
performing, by the hypothesis and evidence scoring stage, evidence scoring to evaluate a likelihood that each candidate answer is a correct answer for the input question based on results of the entity merging of entity clusters.

20. The computing device of claim 14, wherein performing entity merging comprises using a classification model, a distance-based model, or a Markov Chain Monte Carlo based inference model.

* * * * *